United States Patent [19]

Inagaki

[11] Patent Number: 4,674,770

[45] Date of Patent: Jun. 23, 1987

[54] FRAME STRUCTURE FOR VEHICLE BODY

[75] Inventor: Kazuya Inagaki, Toyota, Japan

[73] Assignee: Toyota Jidosha Kabushiki Kaisha, Toyota, Japan

[21] Appl. No.: 769,124

[22] Filed: Aug. 26, 1985

[30] Foreign Application Priority Data

Aug. 28, 1984 [JP] Japan .................. 59-179074

[51] Int. Cl.⁴ .............................................. B62D 21/00
[52] U.S. Cl. ................................................... 280/797
[58] Field of Search ............... 280/797, 798, 799, 781, 280/792

[56] References Cited

U.S. PATENT DOCUMENTS

| 2,794,650 | 6/1957 | Schilberg | 280/797 |
| 2,805,079 | 9/1957 | Vostrez | 280/797 |
| 3,096,996 | 7/1963 | Cole | 280/797 |

FOREIGN PATENT DOCUMENTS 57139475  2/1956  Japan .

Primary Examiner—Richard A. Bertsch

Attorney, Agent, or Firm—Oblon, Fisher, Spivak, McClelland & Maier

[57] ABSTRACT

A frame structure for a vehicle body which has a first frame member having a web portion and flanges, which stand from opposite ends of the web portion, a second frame member having a web portion and flanges which stands from opposite ends of the web portion, and a reinforcement having a web portion and flanges, which stands from opposite ends of the web portion. The reinforcement is inserted within the first frame member, and the web portion of the reinforcement is in contact with the web portion of the first frame member. The flanges of the reinforcement are in contact with the flanges of the first frame member, and the edges of the flanges of the second frame member strike against the edges of the flanges of the reinforcement. The flanges of the reinforcement have upper portions and lower portions. The edges of the flanges of the second frame member strike against the edges of the upper portions, and the lower portions of the reinforcement are welded to the flanges of the first frame member. Thus, if the strength required for the frame structure is constant, the thickness of the outer and inner channels can be reduced because of the disposition of the reinforcement.

5 Claims, 7 Drawing Figures

FRAME STRUCTURE FOR VEHICLE BODY

FIELD OF THE INVENTION

The present invention relates to an improvement in a frame structure for a vehicle body constructed in a closed sectional structure.

BACKGROUND OF THE INVENTION

Side rails B of a conventional frame structure A for a vehicle and particularly for a truck shown in FIGS. 4–7 is formed in such a manner that an inner channel D is engaged with an outer channel C to be welded at flanges E of the outer channel C to the flanges F of the inner channel D at the welded portions G as shown in FIG. 5 to form an integral structure of closed section.

In such an integral structure, the assembling width W of the outer channel C and the inner channel D for forming the side rail B must be maintained constantly. If the width W is not held constantly, the strength of the frame cannot be proved, and the mounting accuracy of other parts to be mounted on the outer and inner channels C, D can be adversely affected, thereby causing the assembling of the vehicle from being disturbed.

In order to maintain the abovementioned assembling width W constant in the conventional frame structure, small holes H, I are respectively opened heretofore at the outer and inner channels C and D as shown in FIG. 6, and a pin J passed from the outer channel C side is inserted to provide means for restricting the interval between the channels C and D. Or, as shown in FIG. 7, a bracket K is welded to the inner channel D, the interval between the channels C and D is restricted by the bracket K, or as disclosed in Japanese Utility Model Laid-open No. 139475/83 official gazette, cutouts are formed at the flanges of the inner channels to form projections having butting surfaces, which are opposed at the edges of the flanges of the outer channel and welded in a structure.

Since the abovementioned means using the pin J has narrow contacting surface of the pin J and the inner channel D, the inner channel D tends to incline so that the accuracy of the assembling width W can not be accurately maintained. Further, it is necessary to provide a number of small holes H, J for passing the pins J, but the many holes cannot be formed without disadvantageously affecting the strength.

In the conventional structure using the bracket K, the weight and the cost increase in the amount of the bracket K, and the step of welding the bracket K to the inner channel D is also required, and yet if the types of the side rail B increase due to the difference in the thickness of the inner channels D, various types of the brackets K must also be prepared for the respective side rails B, and it is also necessary to provide the managing step of preventing the erroneous assembling, which is a drawback.

In addition, in the structure disclosed in Japanese Utility Model Laid-open No. 139475/83, a number of cutouts are formed at the inner channels, resulting in a difficulty in the strength.

OBJECT OF THE INVENTION

Accordingly, an object of the present invention is to provide a frame structure for a vehicle body which can restrict the position of an inner channel by utilizing a reinforcement disposed in an outer channel to form an accurate assembling width W, hold sufficient strength and reduce the weight and cost as compared with the conventional side rails using the brackets, thereby eliminating the necessity of altering the design due to the difference of the thicknesses of the inner channels.

According to the present invention, there is provided a frame structure for a vehicle body comprising a first frame member having a web portion and flanges, which stand from opposite ends of the web portion, a second frame member having a web portion and flanges, which stands from opposite ends of the web portion, a reinforcement having a web portion and flanges, which stands from opposite ends of the web portion, said reinforcement inserted within said first frame member, wherein said web portion of said reinforcement is in contact with said web portion of said first frame member, said flanges of said reinforcement are in contact with said flanges of said first frame member, and edges of said flanges of said second frame member strike against edges of the flanges of the reinforcement in view of the conventional side rails of a frame. Then, the flanges of the reinforcement have upper portions and lower portions, and said edges of said flanges of the second frame member strike against edges of the upper portions, and said lever portions are welded to the flanges of said first frame member.

In the construction of the present invention as constructed as described above, a reinforcement of substantially U-shaped section is disposed in and welded to the outer channel. Thus, if the strength required for the frame structure is constant, the thickness of the outer and inner channels can be reduced in the disposition of the reinforcement. Therefore, the increase in weight and the cost can minimized, the reinforcement has lower and higher flanges, and is welded at the lower flange portion to the outer channel. Thus, the high flange portion maintains the shape at the molding time. A number of such high flanges are interposed between the lengthwise direction of the reinforcement at both sides of the low flanges in such a manner that the edges of the flanges of the inner channel are contacted with the edges of the high flanges to integrally weld the outer channel and the inner channel. Consequently, the assembling width of the outer and inner channels is determined to a predetermined width determined by the thickness of the reinforcement, the height of the high flanges and the height of the flanges of the inner channel.

Further, the inner channel is constructed in a structure to be contacted with the edge of the high flanges of the reinforcement at the edge of the flange, and the necessity of altering the size or the reinforcement due to the difference of the thickness of the channels does not occur as required for the alternation of the design.

The above and other related objects and features will become more apparent from the following description of the preferred embodiments of the present invention when read in connection with the accompanying drawings.

DESCRIPTION OF THE PREFERRED EMBODIMENTS

The present invention will now be described in more detail with reference to the accompanying drawings.

Figure 1:
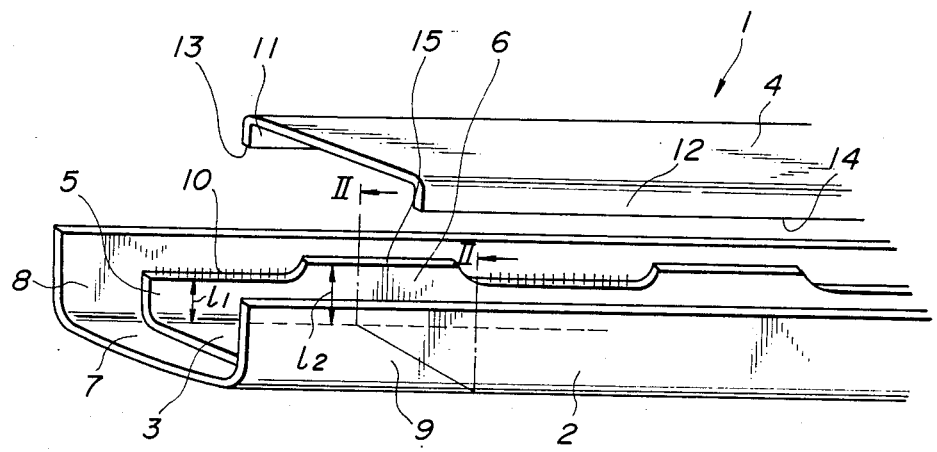
FIG. 1 is an exploded perspective view of an embodiment of a frame structure for a vehicle body according to the present invention.
Figure 2:
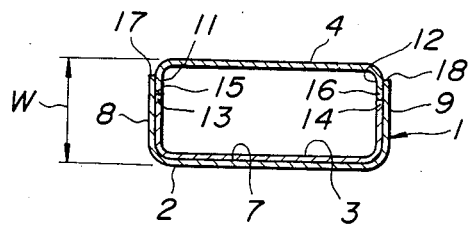
FIG. 2 is a sectional view, taken along the line II—II of FIG. 1.
Figure 3:
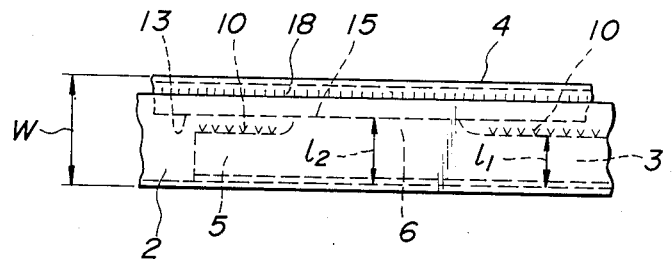
FIG. 3 is a side view of FIG. 1.
Figure 4:
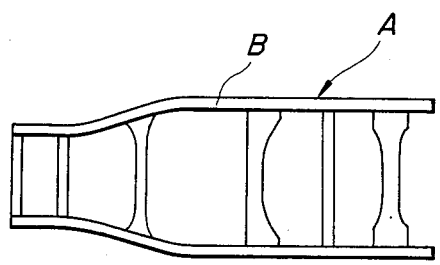
FIG. 4 is a plan view of the frame structure of a vehicle according to the prior art.
Figure 5:
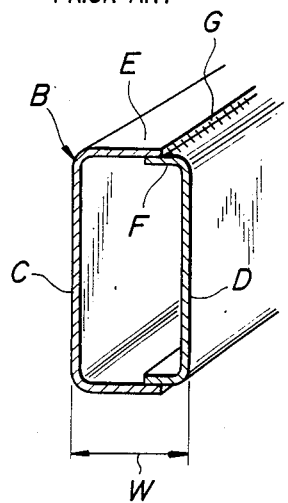
FIG. 5 is a perspective view of the frame structure partly in section of FIG. 4.
Figure 6:
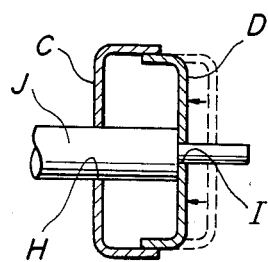
FIG. 6 is a sectional view of the step of assembling the frame structure using an inserting pin.
Figure 7:
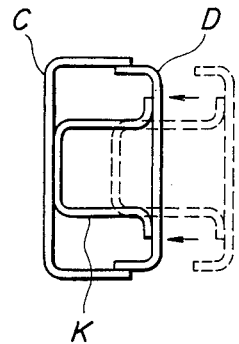
FIG. 7 is an explanatory view of the step of assembling the frame structure using a bracket.

FIGS. 1, 2 and 3 show an embodiment of a frame structure for a vehicle body according to the present invention. A frame structure 1 of closed sectional shape of a vehicle body comprises an outer, or first, channel 2 of substantially U-shaped cross section, a reinforcement 3 of substantially U-shaped cross section, and an inner, or second, channel 4 of substantially U-shaped cross section, all of which are constructed by welding in an integral structure.

The reinforcement 3 has low flanges 5 of height $l_1$ and high flanges 6 of height $l_2$ alternately formed integrally therefrom. A web portion 7 formed inside the outer channel 2 in contact with the web portion of the reinforcement 3. The low flanges 5 of the reinforcement 3 are welded at the edges 10 thereof to the flanges 8 and 9 of the outer channel 2 to form an integral structure with the outer channel 2.

The inner channel 4 has flanges 11 and 12 inserted between the flanges 8 and 9 of the outer channel 2 in such a manner that the edges 13 and 14 of the flanges 11 and 12, respectively, are in contact with the edges 15 and 16 of the high flanges 6 of the reinforcement 3. The inner channel 4 is integrated with the outer channel 2 by the welded portions 17 and 18.

According to the present invention as described above, the edges of the flanges 11, 12 of the inner channel 4 are in contact with the edges of 15, 16 of a number of high flanges 6 of the reinforcement 3 welded to the inside of the outer channel 2. Thus, the assembling width W of the outer and inner channels is determined, thereby providing an effect of remarkably enhancing the accuracy of the assembling width W.

Further, the thickness of the outer channel 2 can be at least reduced by the use of the reinforcement 3. Thus, the weight and the cost can be reduced as compared with the conventional side rail using the bracket even if the reinforcement is used, and an effect of providing sufficient strength can be achieved.

Moreover, even if the thicknesses of the inner channels are variously different, the variation in the thickness of the structure does not considerably affect the assembling structure of the reinforcement and the inner channel. Consequently, it is advantageously not necessary to alter the design of the reinforcement.

What is claimed is:

1. A frame structure for a vehicle body comprising:
   (a) a first frame member having a web portion and flanges, said flanges standing from opposite ends of said of web portion;
   (b) a second frame member having a web portion and flanges, said flanges standing from opposite ends of said web portion; and
   (c) a reinforcement having a web portion and flanges, said flanges standing from opposite ends of said web portion,
   (d) said reinforcement being inserted into said first frame member, said web portion of said reinforcement being in contact with said web portion of said first frame member, said flanges of said reinforcement being in contact with said flanges of said first frame member, and edges of said flanges of said second frame member striking against edges of said flanges of said reinforcement.

2. A frame structure according to claim 1, wherein:
   (a) said flanges of said reinforcement have upper portions and portions and
   (b) said edges of said flanges of said second frame member strike against edges of said upper portions.

3. A frame structure according to claim 2, wherein said lower portions are welded to said flanges of said first frame member.

4. A frame structure according to claim 2, wherein said upper portions and said lower portions are positioned alternately.

5. A frame structure according to claim 1, wherein said flanges of said first frame member are welded to said flanges of said second frame member.

* * * * *